United States Patent [19]

Szabo

[11] 4,352,771
[45] Oct. 5, 1982

[54] METHOD AND APPARATUS FOR CREATING RANDOM SHADOW PATTERNS IN FORMED VINYL SHEET ARTICLE

[75] Inventor: Robert J. Szabo, Kansas City, Mo.

[73] Assignee: Variform Plastics, Inc., Kearney, Mo.

[21] Appl. No.: 254,632

[22] Filed: Apr. 16, 1981

[51] Int. Cl.³ .......................... B29F 3/08; B29D 7/02
[52] U.S. Cl. ................................ 264/210.2; 264/284; 425/325; 425/378 R; 425/384; 425/388
[58] Field of Search ..................... 264/210.2, 284, 286, 264/287, 177 R, 1.6, 2.7; 425/378 R, 325, 384, 388, 71, 336, 369

[56] References Cited

U.S. PATENT DOCUMENTS

| | | | |
|---|---|---|---|
| 2,960,145 | 11/1960 | Ruegenberg | 264/286 |
| 3,024,496 | 3/1962 | Colombo | 264/286 |
| 3,169,274 | 2/1965 | Colombo | 264/286 |
| 3,257,488 | 6/1966 | Rasmussen | 264/286 |
| 3,636,147 | 1/1972 | Rowland | 264/284 |
| 3,673,032 | 6/1972 | Komoly | 264/177 R |
| 3,886,250 | 5/1975 | Danko | 264/177 R |
| 3,899,561 | 8/1975 | Heilmayr | 264/177 R |
| 3,917,772 | 11/1975 | Hollenbeck | 264/210.2 |
| 4,140,827 | 2/1979 | Willwerth et al. | 264/284 |
| 4,247,506 | 1/1981 | Summers | 264/177 R |

Primary Examiner—Jeffery R. Thurlow
Attorney, Agent, or Firm—Schmidt, Johnson, Hovey & Williams

[57] ABSTRACT

A method for creating random shadow patterns in formed vinyl sheet to be used as siding material for buildings. The method includes the step of extruding a flat, hot web of vinyl material having a predetermined thickness and a predetermined distance between the edges thereof, then embossing a graining pattern on one face of the web, cooling the web after it has been embossed and then gathering the web toward the center thereof whereby to reduce the distance between the edges thereof, the web then being preformed, by folding the same along longitudinally extending lines. The sheet is finally formed while restraining the edges of the web whereby to create peaks and valleys cross-sectionally of the web to thereby present the random shadow pattern which is found attractive in finished vinyl siding. The apparatus for fabricating such formed vinyl sheet with random shadow patterns therein includes means for extruding the hot, flat web of vinyl material with a predetermined thickness and a predetermined distance between the edges thereof; means for embossing a graining pattern in one face of the hot web; a centrally disposed eccentric wheel which raises the center of the web in an undulating rib to alter its pattern and which reduces the distance between the edges thereof; a pair of spaced apart rollers which engage the web as it moves from the wheel whereby to again raise the center thereof and further reduce the distance between the edges of the web; and a forming fixture having a passage therein through which the web is passed for final forming into the finished sheet.

15 Claims, 10 Drawing Figures

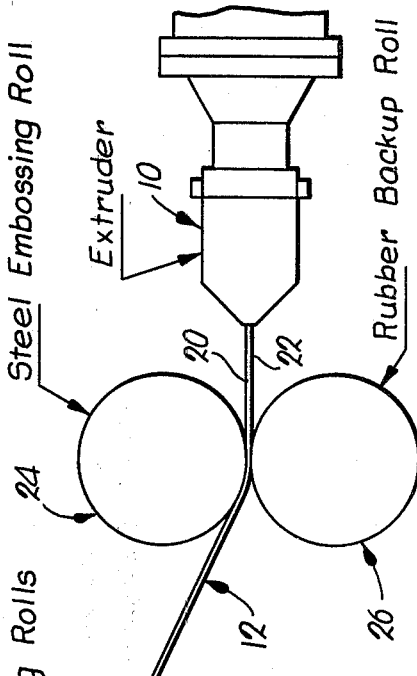
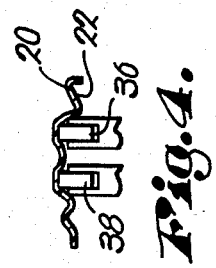
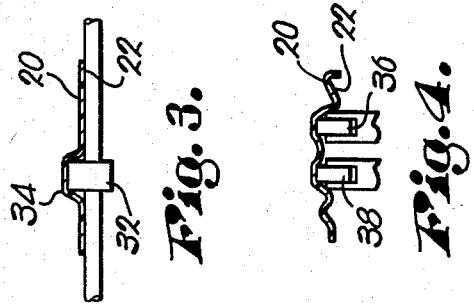
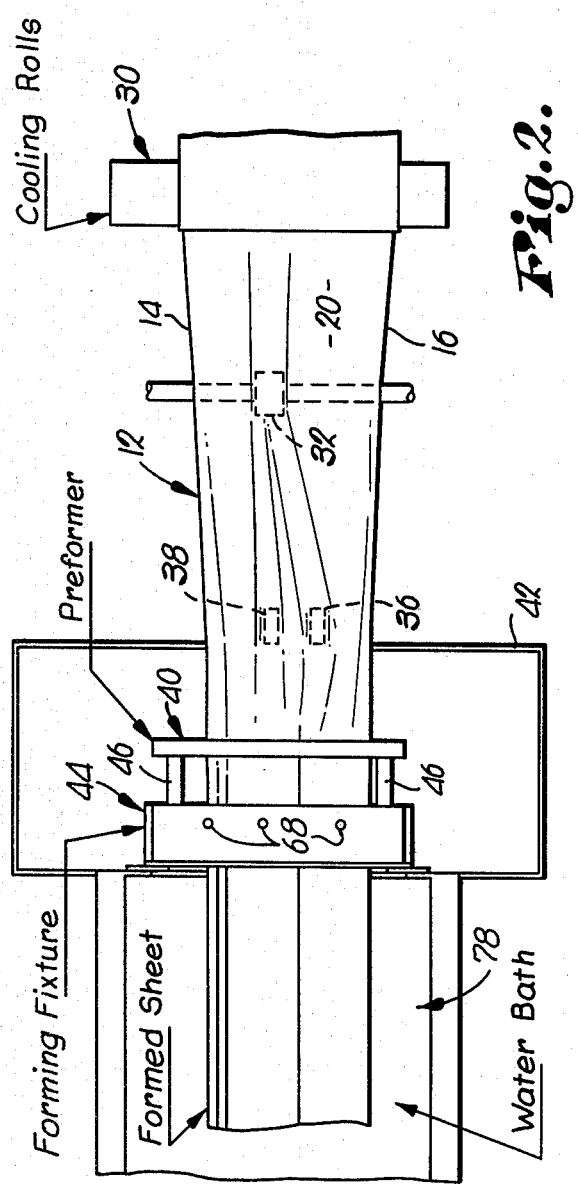
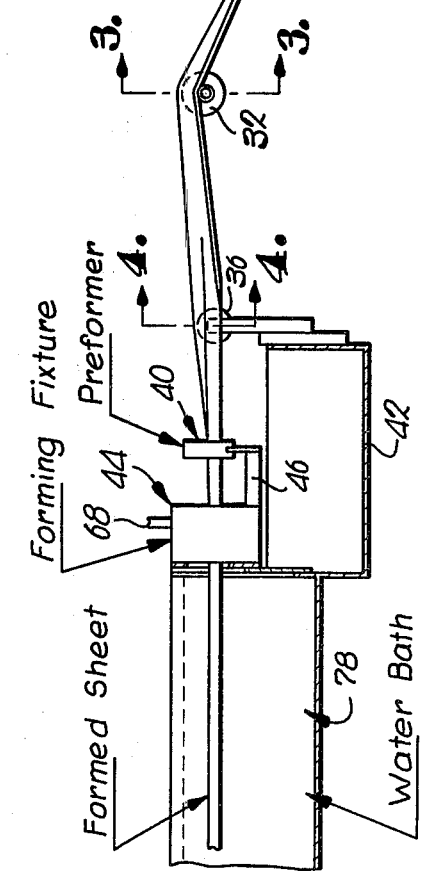

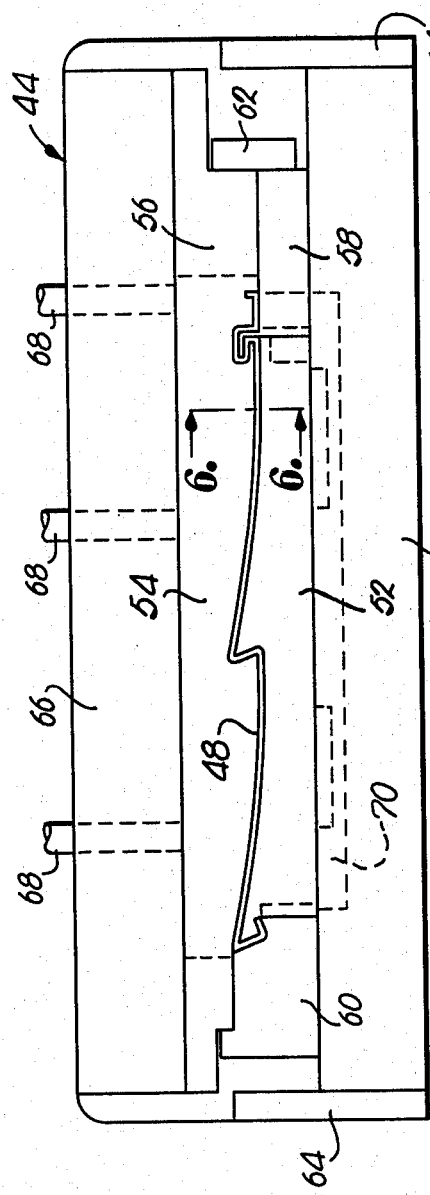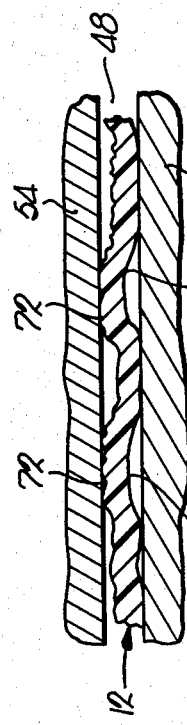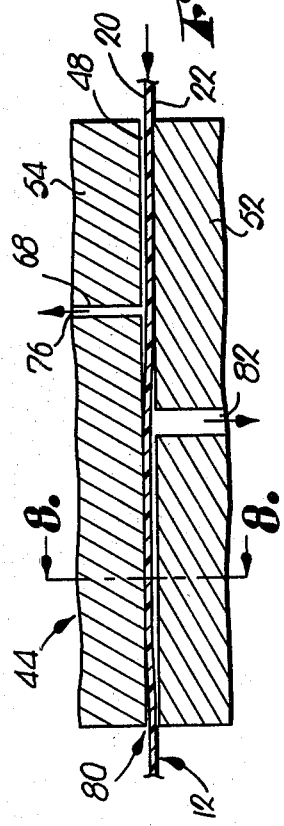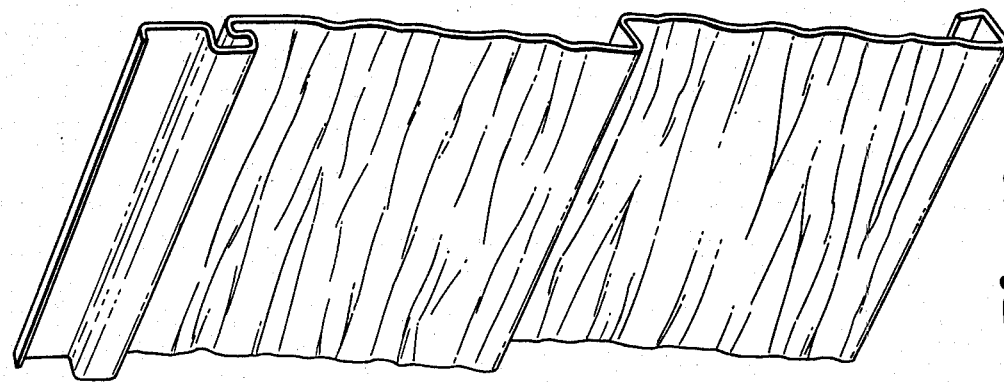

METHOD AND APPARATUS FOR CREATING RANDOM SHADOW PATTERNS IN FORMED VINYL SHEET ARTICLE

BACKGROUND OF THE INVENTION

1. Field of the Invention

The invention relates to the creating of random shadow patterns in vinyl sliding for buildings by passing the siding, as it is formed, through a restricted passage in the forming fixture to create peaks and valleys which result in the random shadow patterns.

2. Description of the Prior Art

It is known to use formed vinyl sheets for siding of buildings such as residences and the like. Such sheets are formed from extruded webs of vinyl material into the desired cross-sectional configuration. In the past, graining has been applied to one face of the web, as it is being finished, in order to lend an attractive appearance thereto which is found desirable in vinyl siding for residences.

However, said graining does not give the overall appearance of wood, which is desirable, and further results in longitudinal lines of weakness in the vinyl material whereby the same is subject to buckling or "oil canning" when the vinyl siding is not carefully applied and when it is subjected to expansion and contraction.

SUMMARY OF THE INVENTION

This invention meets the need for a vinyl siding material which is not only attractive in overall appearance, being very similar to that of wood, but also which is not subject to buckling or "oil canning" due to expansion and contraction caused by varying termperature conditions.

It has been found that random shadow patterns may be formed in the vinyl web after it has been extruded and as it is being formed into the finished sheet, by passing the web of hot material through a forming fixture which has a passage therein receiving the web of vinyl material, the passage being of greater height than the thickness of the vinyl web whereby, when the web is passed therethrough, with the edges being restrained, the web, due to the presence of excess material, is formed into peaks and valleys having a random pattern, which pattern is found desirably attractive in the finished product.

Further, the presence of the random shadow patterns, together with the graining which is embossed on the sheet as it is being formed, tends to strengthen the sheet and to resist buckling or "oil canning" of the material under varying temperature conditions.

The method is performed by initially extruding a flat, hot web of vinyl material having a predetermined thickness and a predetermined distance between the edges thereof and then sequentially reducing the distance between the edges thereof by gathering the web toward the center thereof, the distance between the edges being further reduced by preforming the web to fold the same along predetermined longitudinal lines, the web then moving through a passage which has a height greater than the thickness of the web, there being means for restraining the edges of the web to the reduced distance as it moves through the passage, whereby peaks and valleys are formed in the material, in a random pattern. Cooling means associated with the passage serve to harden the material as it moves through the passage whereby the random patterns will be permanently imparted to the finished, formed sheet.

The apparatus for accomplishing the above described method includes means for extruding a hot web of vinyl material having a predetermined thickness and a predetermined distance between the edges thereof, means for gathering the web toward the center thereof to sequentially reduce the distance between the edges of the web, means for preforming the web by folding the same along longitudinally extending lines to further reduce the distance between the edges and a forming fixture for finally forming the web into the finished sheet, the forming fixture having a passage therein, through which the web passes, the passage being of a height greater than the thickness of the web and having therein means for restraining the edges of the web to the reduced distance between the edges whereby peaks and valleys are formed in the web as it is moved through the passage, there being means for cooling the web as it is so moved whereby to permanently impart to the formed sheet of vinyl material the desired random shadow patterns.

BRIEF DESCRIPTION OF THE DRAWINGS

FIG. 1 is a schematic view showing the method for creating a formed sheet of vinyl material with random shadow patterns therein;

FIG. 2 is a fragmentary top plan view of the apparatus schematically illustrated in FIG. 1;

FIG. 3 is a fragmentary sectional view taken on line 3—3 of FIG. 1 and showing the means for initially gathering the web toward the center thereof.

FIG. 4 is a fragmentary sectional view taken on line 4—4 of FIG. 1 and showing the means for further gathering the web toward the center thereof to reduce the distance between the edges of the web;

FIG. 5 is an elevational view of the forming fixture, which is schematically shown in FIG. 1;

FIG. 6 is a sectional view taken on line 6—6 of FIG. 5 and fragmentarily showing the forming fixture and the passage therein;

FIG. 7 is a fragmentary view of the web of vinyl material after it has been embossed with a graining pattern;

FIG. 8 is an enlarged, fragmentary sectional view taken on line 8—8 of FIG. 6 and showing the web of vinyl material as it moves through the passage to form peaks and valleys therein;

FIG. 9 is a fragmentary cross-sectional view of the formed sheet of vinyl material after it has been embossed with the graining and has had the random shadow patterns formed therein; and FIG. 10 is a perspective, fragmentary view of the finished sheet of vinyl siding created by the method and apparatus hereinafter described in more detail.

DESCRIPTION OF THE PREFERRED EMBODIMENT

The method hereinafter disclosed for forming vinyl siding or the like having random shadow patterns therein generally follows the method heretofore employed for forming conventional vinyl siding of the type used on residences and the like and which is conventionally fabricated by extruding a web of hot vinyl material, graining the same for purposes of appearance and then, after it has been cooled, passing the web of moving material through a suitable forming fixture which has a passage therein of the desired cross-sectional configuration for the vinyl siding whereby the same may be finished to a final form.

However, in the present instance, said method has been improved by providing means for forming a random shadow pattern in the finished vinyl sheet, which renders the siding more attractive aesthetically and also adds strength thereto.

The apparatus for carrying out said method is shown in the drawings and includes an extruder 10 which conventionally extrudes a flat, hot web of vinyl material 12, the vinyl material being of predetermined width and a predetermined thickness, all of which is fixed by the nature of the extruding head 10.

Thus, the web 12 as presented by the extruder is flat and has a pair of opposed edges 14 and 16, as best shown in FIG. 2 and has one face 20, this being the uppermost face as the web 12 moves from the extruder; and an other face 22, this being the normally lowermost face as the web moves from the extruder and as is illustrated in the drawings.

Suitable mechanism (not shown) in the form of take-off rolls or the like is provided at the end opposite the web from extruder 10 whereby the web is moved from right to left, viewing FIG. 1, at a predetermined speed. Thus, the web 12 is constantly moving from a right to left direction viewing FIG. 1 of the drawing.

After the web 10 is initially extruded it passes beneath a steel embossing roll 24 and a rubber back up roll 26 whereby a graining pattern is applied to the one face 20 of the web 12.

The graining pattern is shown in cross-section in FIG. 7 of the drawing and consists of a plurality of grooves extending longitudinally of the web, the grooves being designated as 28 and being of various depths and widths, depending upon the pattern on the embossing roll 24.

In the present instance, however, it is desirable that the grooves 28 be considerably deeper than normal whereby to be in the nature of lines of weakness extending randomly of the length of the face 20 of web 12.

After passing through the embossing rolls 24 and 26, the web passes over conventional cooling rolls 30 which serve to somewhat reduce the temperature of the web, which temperature has been elevated by the extrusion thereof. It should be noted that as it passes over the cooling rolls 30 the web retains its flat condition and the distance between edges 14 and 16 becomes less than when the web 12 was originally extruded, due to the cooling and draw down.

As the web 12 continues its movement, it passes over an eccentric wheel 32 which is suitably mounted in the path of movement of the web 12 and which has a surface, as best shown in FIG. 3, which engages the face 22 of the web substantially centrally thereof, thereby raising the center of the web 12, as in the form of an undulating rib 34 which alters the pattern of web 12. It will be appreciated that as the rib 34 is raised by the wheel 32, the web is gathered inwardly toward the center thereof, reducing the distance between edges 14 and 16 and thus the overall width of the web 12.

As it passes over the wheel 32, the web 12 is sufficiently soft that the rib 34 is not actually formed therein but rather the wheel 32 merely serves to raise the center portion of the web whereby to pull or gather the edges 14 and 16 toward said wheel 32, thereby reducing the distance between said edges 14 and 16.

As the web continues beyond the wheel 32 in a generally softened condition, it passes over a pair of spaced apart rollers 36 and 38 which are disposed transversely of the path of movement of the web 12 generally proximal to the center of the web and which rollers 36 and 38 each have a surface which engages the face 22 of the moving web 12 whereby to further gather the web 12 toward the center thereof generally along spaced longitudinally extending lines defined by the path of movement of the rollers 36 and 38 upon the face 22 of the web. The general configuration of the center portion of the web 12 as it moves over rollers 36 and 38 is shown in FIG. 4 of the drawing.

Thus, it will be appreciated that after the web has passed over wheel 32 and rollers 36 and 38, the central portion thereof has been distorted along the length thereof, from its initial flat condition, to a condition wherein the central portion of the web 12 has been raised, all of which results in the gathering in of the web toward the center thereof and thus the sequential reduction of the distance between edges 14 and 16 of the moving web 12.

After passing over rollers 36 and 38, the still hot, very flexible web 12 is moved into a preformer 40 which preformer 40 is suitably mounted in the path of movement of the web 12 above a catch basin 42 and in front of a forming fixture 44, there being spacer arms 46 positioning the preformer 40 in front of the forming fixture 44.

The preformer 40 has a passage therein of the same general configuration as is desired for the cross-sectional configuration of the finished, formed sheet. Thus, as the moving web 12 passes through the passage or opening in preformer 40, the web is initially folded along predetermined lines, such folding serving to further reduce the distance between the edges 14 and 16 of the web. It should be appreciated that, in moving through the opening provided in the preformer 40, which opening is not shown in the drawing, the web is still in a highly flexible state, due to the temperature thereof, and it is just loosely folded or formed by moving through the passage in preformer 40 but yet is sufficiently folded to further decrease the distance between the edges of the web.

The web 12 moves from preformer 40 into the final forming fixture 44 which forming fixture 44 has a passage 48 therein of the cross-section desired for the finished, formed sheet of material.

In the embodiment illustrated and hereinabove referred to, the vinyl material is to be formed into siding and thus the passage 48 has the desired configuration, all as best illustrated in FIG. 5 of the drawing.

The passage 48 is defined by suitable blocks which make up the forming fixture 44, there being for instance a base 50, a lower fixture block 52, an upper fixture block 54, a pair of hook blocks 56 and 58, a butt block 60, a stop 62. The base 50 supports said blocks and the same are held in position by opposed end plates 64 and covered by a vacuum cap 66. It will be appreciated that the exact configuration of the aforementioned blocks serves to define the configuration of the passage 48 and that any desirable configuration can be accomplished by merely varying the shape of the blocks. The blocks are positioned so that the edges of the web 12 are restrained against outward movement as the web passes through the passage 48 in the forming fixture 44.

The fixture 44 has therein vacuum ports 68 which are coupled with a suitable source of vacuum and also water drain slots 70 for purposes which will hereinafter become apparent.

It is most important that the passage 48 have a clearance or height which is greater than the thickness of the web 12 as the web moves therethrough. In practice, it has been found desirable to have the web of approximately a 0.042 thickness and the height of the passage ranging from 0.050 to 0.075.

The purpose of having the height of the passage 48 greater than the thickness of the web 12 is that, as the web, which has had the edges thereof gathered inwardly, is moved through the passage and the edges thereof restrained against outward movement, the web will "buckle" into the configuration shown in FIG. 8 for instance, whereby to create, in the web peaks such as 72 and corresponding valleys such as 74. These peaks and valleys are randomly formed in the web as it moves through the passage, some of the formation thereof being due to the lines of weakness created by the deeper grooves 28 which have been formed in face 20 of the web 12 while it is hot and before it moves into the passage 48.

As the web moves through the passage 48, in the manner generally shown in FIG. 6 of the drawing, a vacuum is pulled out of said passage as at 76, which vacuum serves to remove water from the passage and to pull air thereinto.

The water comes from a water bath 78 located adjacent the forming fixture 44 and in such a position that water may move into the passage as at 80 whereby to move along the opposed faces 20 and 22 of the web 12 as it moves through the passage, thereby cooling the web as it moves through the passage 48. The water is evacuated from the passage by means of a port 82 whereby the water drains into the catch basin 42.

Particularly referring to FIG. 6, and noting that the movement of the web as shown therein is from right to left, there is a "line of cooling" created directly beneath the vacuum port 76 inasmuch as air is drawn into the passage from the right hand side, viewing FIG. 6, and water enters from the left hand side, as at 80, viewing FIG. 6, some of the water exiting through port 82 but some also being pulled out by the vacuum port 76 whereby there is a line of cooling clear across the web 12 at essentially the position of vacuum port 76.

Thus, as the web 12 moves through the passage 48, it is retained in its previously gathered condition, that is, with the distance between the edges 14 and 16 thereof reduced beyond the distance between said edges when the web was originally extruded, the hot web, as it moves into the forming fixture 44 being not only finally formed into the general cross-sectional configuration shown in FIG. 5, but also moving into peaks and valleys due to the fact that the height of the passage 48 is greater than the width of the web 12, the peaks and valleys creating random shadow patterns as shown in FIG. 10 of the drawing and as also illustrated in FIG. 9, the random shadow pattern consisting of peaks and valleys which are formed cross-sectionally of the finished formed sheeting, that is in both faces thereof, there being graining grooves 28 in one face thereof.

The finished product, as illustrated in FIG. 10, has been found to be extremely attractive and very much like wood in its appearance, it being appreciated that the vinyl web can be made of any desired color. It has also been found that the presence of the peaks and valleys, which extend longitudinally of the finished sheet, tend to add strength thereto.

In forming vinyl siding of the type illustrated, it has been found that the width of the web, that is the initial distance from edge 14 to edge 16, should be generally one inch greater than the width of the passage 48. It has also been found that the web, when initially extruded, desirably has a thickness of approximately 0.042 and that the passage 48 has a height or clearance of from 0.050 to 0.075 whereby to permit the web sufficient room within which to achieve the peaks and valleys, all as hereinabove described, whereby the very desirable random shadow pattern may be formed in the vinyl sheet.

I claim:

1. A method of creating random shadow patterns in formed vinyl sheet including the steps of:
    extruding a flat, hot web of vinyl material having a predetermined thickness and a predetermined distance between the edges thereof;
    gathering said web towards the center thereof to reduce the distance between said edges;
    preforming said web to further reduce the distance between said edges;
    moving said web through a smooth-walled passage having a height greater than the thickness of said web while restraining said edges whereby to create wrinkles in said web to present a random pattern, rugose surface; and
    cooling said web as it is moved through said passage whereby to create said formed vinyl sheet having random shadow patterns therein.

2. The method as set forth in claim 1 including the step of embossing a graining pattern on said web after it is extruded and before it is gathered.

3. The method as set forth in claim 2, said graining pattern being created by forming grooves of a predetermined depth longitudinally of one face of said web.

4. The method as set forth in claim 3, including the step of first cooling said web after it has been embossed and before it is gathered.

5. The method as set forth in claim 4, said gathering being initially accomplished by raising the center of the web to thereby cause the distance between said edges to be reduced.

6. The method as set forth in claim 5, wherein gathering of said web is further accomplished by raising said web along transversely spaced longitudinally extending lines to thereby cause the distance between said edges to be further reduced beyond that accomplished by said initial gathering.

7. The method as set forth in claim 6, the step of preforming said web including the preliminary folding of the web along predetermined lines to further reduce the distance between the edges thereof.

8. The method as set forth in claim 7, the web being finally folded and formed along said predetermined lines as it moves through said passage and is subjected to said cooling.

9. The method as set forth in claim 1 wherein the thickness of said web is approximately 0.042 and the height of said passage is from 0.050 to 0.075.

10. Apparatus for creating random shadow patterns in formed vinyl sheet comprising:
    means for extruding a flat hot web of vinyl material having a predetermined thickness and a predetermined distance between the edges thereof;
    means for gathering said web toward the center thereof to reduce the distance between said edges;
    means for preforming said web by folding the same along predetermined longitudinally extending lines, to further reduce the distance between the edges thereof;

a forming fixture having a smooth-walled passage therein of a height greater than the thickness of the web and means for restraining the edges of the web to said further reduced distance apart whereby wrinkles are formed in said web as it is moved through said passage; and means for cooling said web as it moves through said passage.

11. Apparatus as set forth in claim 10, there being embossing rollers for forming a graining pattern in one face of said web after it is extruded and before it is initially gathered.

12. Apparatus as set forth in claim 12, there being means for cooling said web after it is embossed and before it is gathered.

13. Apparatus as set forth in claim 12, said means for gathering said web including an eccentric wheel for engaging the other face of said web after it is cooled.

14. Apparatus as set forth in claim 13, said means for gathering said web further including a pair of spaced apart rollers engaging the other face of said web as it moves between said wheel and said means for preforming.

15. Apparatus as set forth in claim 10, the web having a thickness of approximately 0.042, the height of said passage being from 0.050 to 0.075.

* * * * *